United States Patent
Turner

(10) Patent No.: US 6,360,993 B1
(45) Date of Patent: Mar. 26, 2002

(54) EXPENDABLE LAUNCH VEHICLE

(75) Inventor: Andrew E. Turner, Mountain View, CA (US)

(73) Assignee: Space Systems/ Loral, Inc., Palo Alto, CA (US)

( * ) Notice: Subject to any disclaimer, the term of this patent is extended or adjusted under 35 U.S.C. 154(b) by 0 days.

(21) Appl. No.: 09/289,037

(22) Filed: Apr. 9, 1999

(51) Int. Cl.[7] .................................................. B64G 1/10
(52) U.S. Cl. .................................. 244/158 R; 244/172
(58) Field of Search ........................... 244/158 R, 172, 244/2

(56) References Cited

U.S. PATENT DOCUMENTS

| | | | | |
|---|---|---|---|---|
| 3,242,811 A | * | 3/1966 | Swet .......................... | 244/172 |
| 3,304,724 A | * | 2/1967 | Blumrich et al. ........... | 244/172 |
| 4,787,579 A | * | 11/1988 | Smith ......................... | 244/169 |
| 4,830,314 A | * | 5/1989 | Hujsak ....................... | 244/172 |
| 5,799,902 A | * | 9/1998 | Keith et al. ................. | 244/172 |
| 5,984,235 A | * | 11/1999 | Snowhook ................... | 244/172 |
| 6,113,032 A | * | 9/2000 | Cochran et al. ............. | 244/172 |
| 6,113,035 A | * | 9/2000 | Hubert ....................... | 244/169 |

OTHER PUBLICATIONS

European Search Report EP 00 30 2909, European Patent Office, 18.05.01, 40 p.p.
"Percheron–A Space Workhorse" XP–001004453, Paul D. Maley, Mar. 3, 1982, 2 p.p.
European Search Report EP 0 763 468 A1, European Patent Office, Mar. 19, 1997 40 p.p.
"Sea Dragon in the Manned Mars Mission" Robert C. Truax, 18 p.p.
"Liquid Propellant Rocket Systems", 1 p.p.
"Thousand Tons to Orbit", Robert C. Truax, Jan. 1963, 6 p.p.

* cited by examiner

Primary Examiner—Galen L. Barefoot
(74) Attorney, Agent, or Firm—Perman & Green, LLP

(57) ABSTRACT

A system for supplying a space station or satellite comprises a low cost expendable single-stage to orbit launch vehicle having a moderate reliability in the range of about 0.5 to 0.8 for launching a payload of consumable items to low earth orbit. For propulsion, the launch vehicle includes a pressure-fed rocket engine, preferably with a nozzle for aiming products of combustion in a direction away from the launch vehicle and having a fixed orientation relative to the launch vehicle. A pressurant tank contains an inert pressurant gas under pressure. A conduit system serves to introduce the inert pressurant gas from the pressurant tank to a fuel tank and thence to the rocket engine and also to introduce the inert pressurant gas from the pressurant tank to an oxidizer tank and thence to the rocket engine for combustion with the fuel. The initial pressure in the pressurant tank is maintained at a level in excess of about 100 bar; the initial pressure in the fuel tank and in the oxidizer tank is maintained at a level in the range of about 8.5 to 20.0 bar; and the initial pressure in the rocket engine is maintained at a level in the range of about 5 to 10 bar. Additional conduits are provided for adding inert pressurant gas to the pressurant tank or for removing pressurant gas therefrom, for adding fuel to the fuel tank or for removing fuel therefrom, and for adding oxidizer to the oxidizer tank or for removing oxidizer therefrom.

9 Claims, 4 Drawing Sheets

EXPENDABLE LAUNCH VEHICLE

BACKGROUND OF THE INVENTION

1. Field of the Invention

The present invention relates generally to rocket launch systems and, more particularly, to a low cost, expendable launch vehicle for launching consumables to low earth orbit to supply a space station or satellites.

2. Description of the Prior Art

In recent years a number of new launch vehicles (LV) have begun development with the intention of dramatically reducing launch costs. The majority of these are reusable launch vehicles (RLV) with the goal of frequent re-use in aircraft-like operations. These craft generally depend on new technology which has attendant costs and risks. The only RLV in current use, the Space Shuttle, has not lived up to promises of low operational cost and ease of use. In every instance known to the applicant, vehicles are sought with ever greater reliability and attendant cost.

It was with knowledge of the foregoing state of the technology that the present invention has been conceived and is now reduced to practice.

SUMMARY OF THE INVENTION

The present invention relates to a concept for a low-cost, moderate reliability launch vehicle to ship consumables such as water, food, oxygen, nitrogen, propellants, as well as other nonperishable items of low intrinsic value such as spare parts to low earth orbit (LEO). This concept has a goal of reducing launch costs below $1,000 per kilogram using existing technology by taking advantage of the savings inherent in a launch vehicle overall reliability of about 0.7 or less, and in the economy of scale provided by mass production of more than 1000 units annually. Infrastructure needed to support the system of the invention both at the launch site and in orbit have also been considered. Launch costs for spacecraft intended for geosynchronous orbit can be shown to be reducible by a factor of two or three depending upon the concepts and cost models used. In this regard, FIG. 1 is a graph which presents an estimate of cost of an individual launch as a function of reliability and the effective cost of lifting a payload into orbit, or payload cost. A simplistic algorithm based on empirical observations has been employed in its formulation. It is noteworthy that payload cost appears to be nearly flat in a region of reliability between 0.6 and 0.7 and remains close to a minimum value in a region of reliability between 0.5 and 0.8, indicating this to be a region of choice for reliability.

In short, the present invention flies in the face of conventional wisdom by accepting a launch vehicle of moderate reliability and accepting some amount of losses rather than one always seeking the very highest reliability humanly possible.

Preliminary studies of this new LV concept suggest that a launch success rate or overall reliability of about 0.67 is appropriate, and a launch cost of $600 K is a useful goal. For study purposes, a launch rate of 3000 annually is assumed, each carrying a payload of one metric ton. Even when the 0.67 reliability is included, payload costs in orbit would still be sufficiently below $1000/kg to permit amortization of development and other costs to establish this system while meeting the $1000/kg goal.

Uses of the payloads would include ISS (international space station) re-supply and propellant for geosynchronous orbit (GEO) and other high-value payloads launched by high-reliability LVs. Launching high-value spacecraft to LEO and then using reusable orbital maneuvering vehicles for insertion into GEO would result in substantial savings in launch costs. It is well to recognize that the environment for an orbital maneuvering vehicle is considerably less demanding than the environment for a launch vehicle. Therefore, it is appropriate to have the orbital maneuvering vehicle be reusable even though the launch vehicle is not reusable.

Costs are kept low while incurring acceptable impacts to reliability through a number of features. First, the use of a single pressure-fed main engine is assumed which provides no redundancy but avoids the thermal, contamination and other problems involved in exhaust plume interaction. This engine is ignited only once during the mission and is not re-ignited during flight minimizing ignition problems. This LV is a single-stage-to-orbit eliminating the need for staging.

A pressure-fed propellant delivery system using helium (He) gas as pressurant is assumed, eliminating the need for costly turbomachinery. This will provide an estimated regulated propellant tank pressure of 8.5 bar throughout main engine operation, to maintain engine chamber pressure of 5 bar. To aid the reader, a bar is a unit of pressure equal to one million dynes per square centimeter and thus is slightly less than one atmosphere. Gaseous nitrogen ($N_2$) is used for a cold-gas reaction control subsystem (RCS). The RCS is used for attitude control during powered flight and He pressurant is expelled in a blow-down mode for orbital insertion and de-orbit maneuvers. A design goal is to use the RCS for all attitude control operation and avoid the need to gimbal the main engine. RCS operation is simplified by mounting, the payload aft thus center of gravity (CG) motion is favorable during powered flight. Guidance and control is simplified through the use of a GPS navigation and fiber optic gyro attitude sensing subsystem to avoid the need for costly star or earth sensors.

Use of liquid hydrogen ($LH_2$) and liquid oxygen (LOX) for propellant is assumed. This propellant mix actually involves a lower combustion temperature than kerosene and LOX. Both of these propellants are available at relatively low cost via methanol cracking for $LH_2$ and air liquefaction for LOX. Total propellant mass of 116.6 metric tons is estimated for a gross liftoff weight of 130 metric tons, yielding a mass when orbit is achieved of just over 13 metric tons.

The system of the invention will require supporting infrastructure both prior to launch and in orbit. Due to the relatively low reliability of this LV, many failures will occur close to liftoff, making desirable launch at sea using disposable, low-cost equipment to keep the LV afloat and erect for launch. Loading cryogenic propellant and pressurant aboard a low-reliability LV at sea necessitates procurement of sufficient quantities of remotely-operated equipment to allow for losses due to mishaps during this critical phase. In orbit, a fleet of Orbital Maneuvering Vehicles (OMV) will be used to remove payloads from the system launch vehicles and transfer the payloads to depots in higher orbits. The depots and OMVs would be launched on high-reliability LVs, expenses that will need to be amortized over several years of operations.

A primary feature, then, of the present invention is the provision of a rocket launch system utilizing an expendable launch vehicle for launching consumables to low earth orbit to supply a space station or satellites.

Another feature of the present invention is the provision of such a launch system in which a low cost launch vehicle supplies consumable items to earth orbit. In this regard, a consumable item may be defined as an item of low intrinsic value which would be expended through use in a space station or a satellite, for example, potable water in a space station or fuel in a space station or satellite. A consumable item may also be defined as an item which is inexpensively replaced in the event of a launch failure. It is the total quantity of each type of consumable item supplied to the earth orbit user over an extended span of time which is of interest, not that each individual item has the maximum or even a high probability of success in reaching the user.

Still another feature of the present invention is the provision of such a rocket launch system in which the launch vehicle need not itself rendezvous with or even approach the space station or satellite to which the consumable items are to be supplied. The launch vehicle need only be made accessible to a satellite, or orbital maneuvering vehicle, which is capable of modifying the path it follows in earth orbit, also making rendezvous and exchanging items with other orbiting craft. Such craft would include a space station or satellite to which consumable items are to be supplied and the launch vehicle. The orbital maneuvering vehicle would not be capable of entering the low altitude regions of the atmosphere which the launch vehicle traverses during launch, thus minimizing its design and operational costs. Accessibility of the launch vehicle to the orbital maneuvering vehicle means that the launch vehicle achieves orbital altitude of about 200 km (124 statute miles) or higher and does not traverse regions significantly below this altitude.

Yet another feature of the present invention is the provision of such a rocket launch system in which the launch vehicle need not maintain itself in the orbital path mentioned above. The launch vehicle and all component parts except consumable items actively removed by and under the control of the orbital maneuvering vehicle mentioned above are expected to re-enter the lower atmosphere of earth and be broken up by aerodynamic forces and heating within about one week after the 200 km (124 statute mile) altitude is achieved, thus complying with U.S. Government guidelines to avoid placing debris in orbits around earth for extended periods of time.

Still a further feature of the present invention is the provision of such a rocket launch system in which the launch vehicle can be made available for launch in sufficient quantities to assure a continuous supply of consumable items to one or more space stations and multiple satellites in earth orbit, even allowing for losses due to launch failures of the launch vehicle.

Yet a further feature of the present invention is the provision of such a rocket launch system in which the launch vehicle can be permitted to be destroyed by commands transmitted by radio by authorized persons on the ground or by commands generated by onboard computing devices evaluating input from onboard sensors in the event of a malfunction or other deviation from planned operation without delaying or affecting other launches of the launch vehicle planned for the same calendar day or any other calendar day. Onboard computing devices can be defined as a microprocessor or other computer capable of following a program written by a human operator. Sensors can be defined as suitable instruments which can determine the orientation of the launch vehicle including the direction of flight, or a pressure transducer which measures the pressure inside the fuel tank mentioned above and enables the onboard computing device to evaluate whether sufficient fuel remains in the tank to achieve the orbital conditions earlier described.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and together with the description, serve to explain the principles of the invention in general terms. Like numerals refer to like parts throughout the disclosure.

DETAILED DESCRIPTION OF THE PREFERRED EMBODIMENTS

Figure 1:
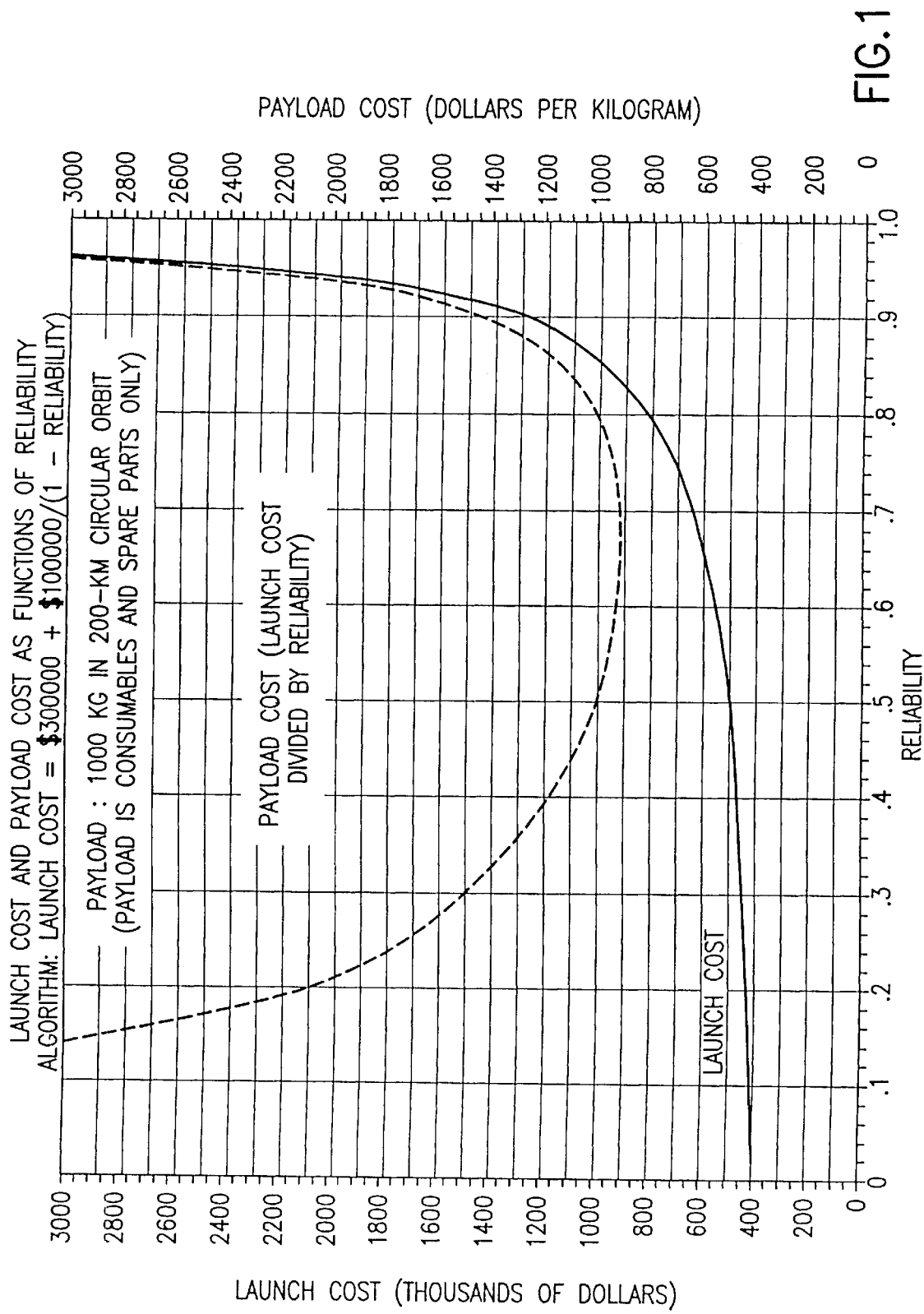
FIG. 1 is a graph for estimating the cost of an individual launch as a function of reliability and the effective cost of lifting a payload into orbit.
Figure 2:
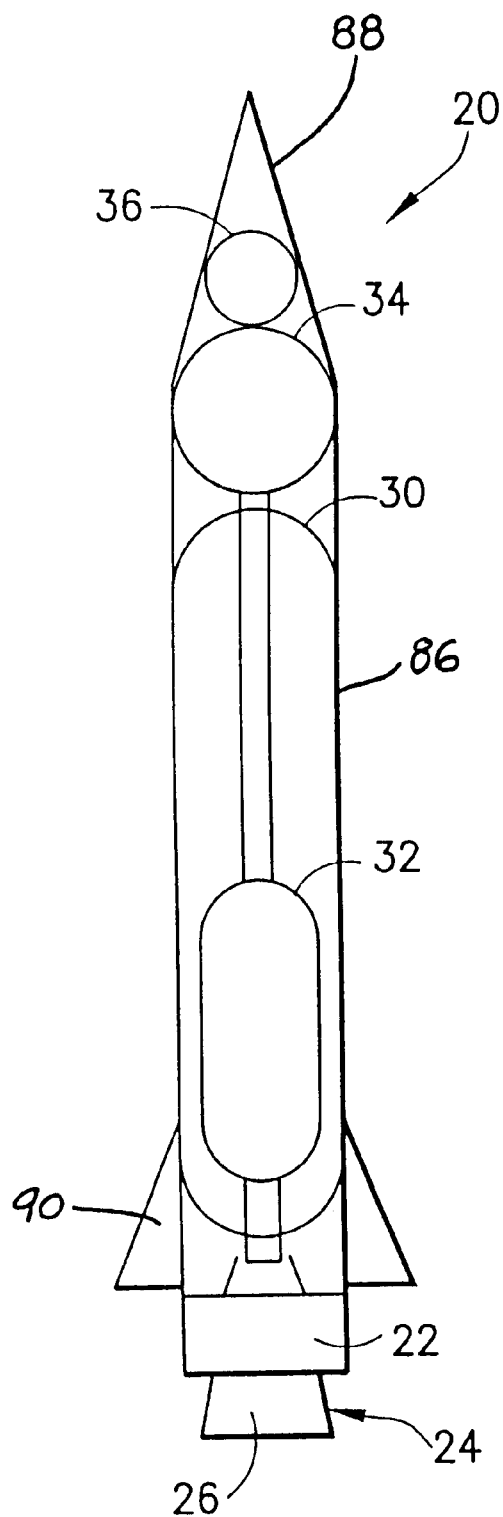
FIG. 2 is a diagrammatic side elevation view, in section, of a launch vehicle embodying the present invention.

Turn now to the drawings and, initially, to FIG. 2 which generally illustrates a low cost expendable single-stage to orbit launch vehicle 20 having a moderate reliability in the range of about 0.5 to about 0.8 for launching a payload 22 of consumable items to low earth orbit to supply a space station or satellite. It was earlier explained that, for purposes of the invention, a consumable item is an item of low intrinsic value which would be expended through use in a space station or a satellite, for example, potable water in a space station or fuel in a space station or satellite. A consumable item may also be defined here as an item which is inexpensively replaced in the event of a launch failure. It is the total quantity of each type of consumable item supplied to the earth orbit user over an extended span of time which is of interest, not that each individual item has the maximum or even a high probability of success in reaching the user.

The launch vehicle 20 includes a single pressure-fed rocket engine 24 for propelling it into space and equipped with a nozzle for aiming products of combustion in a direction away from the launch vehicle. Thus, there is no staging or in-fight ignition of multiple engines. In a preferred embodiment of the invention, the nozzle has a fixed orientation relative to the launch vehicle, rather than a gimbaled design which would provide some freedom of movement about a longitudinal axis of the vehicle. While a gimbaled design may be desirable in some instances, it is more complex and costly than a fixed orientation design.

As clearly seen in FIG. 2, the payload 22, which may be of a toroidal design, is preferably mounted aft, near the engine 24, so that the center of gravity of the launch vehicle is located as close to the engine as possible. When the launch vehicle arrives at its destination in low earth orbit, the payload may be removed by an orbital maneuvering vehicle 28 (see FIG. 3), then taken to a higher orbit where the receiving space station or satellite resides.

Returning to FIG. 2 for a moment, the launch vehicle 20 also includes a fuel tank 30 containing fuel and an oxidizer tank 32 containing oxidizer, each for delivery to the rocket engine 24. Additionally, and of prime importance, the launch vehicle also includes a pressurant tank 34 containing an inert pressurant gas such as helium. The helium pressurant gas is used to move the fuel and oxidizer to the engine for combustion in order to achieve orbital insertion and, subsequently, to provide a de-orbit maneuver at the end of the mission. Gaseous nitrogen ($N_2$) contained within a tank 36 may be provided for a cold-gas reaction control subsystem (RCS) used for attitude control during powered flight. In typical fashion, the components of the launch vehicle 20 as already described may be encapsulated within an outer skin 86 and the launch vehicle also includes a nose cone 88 for streamlining at the lower altitudes and fins 90 for stability.

Figure 4:
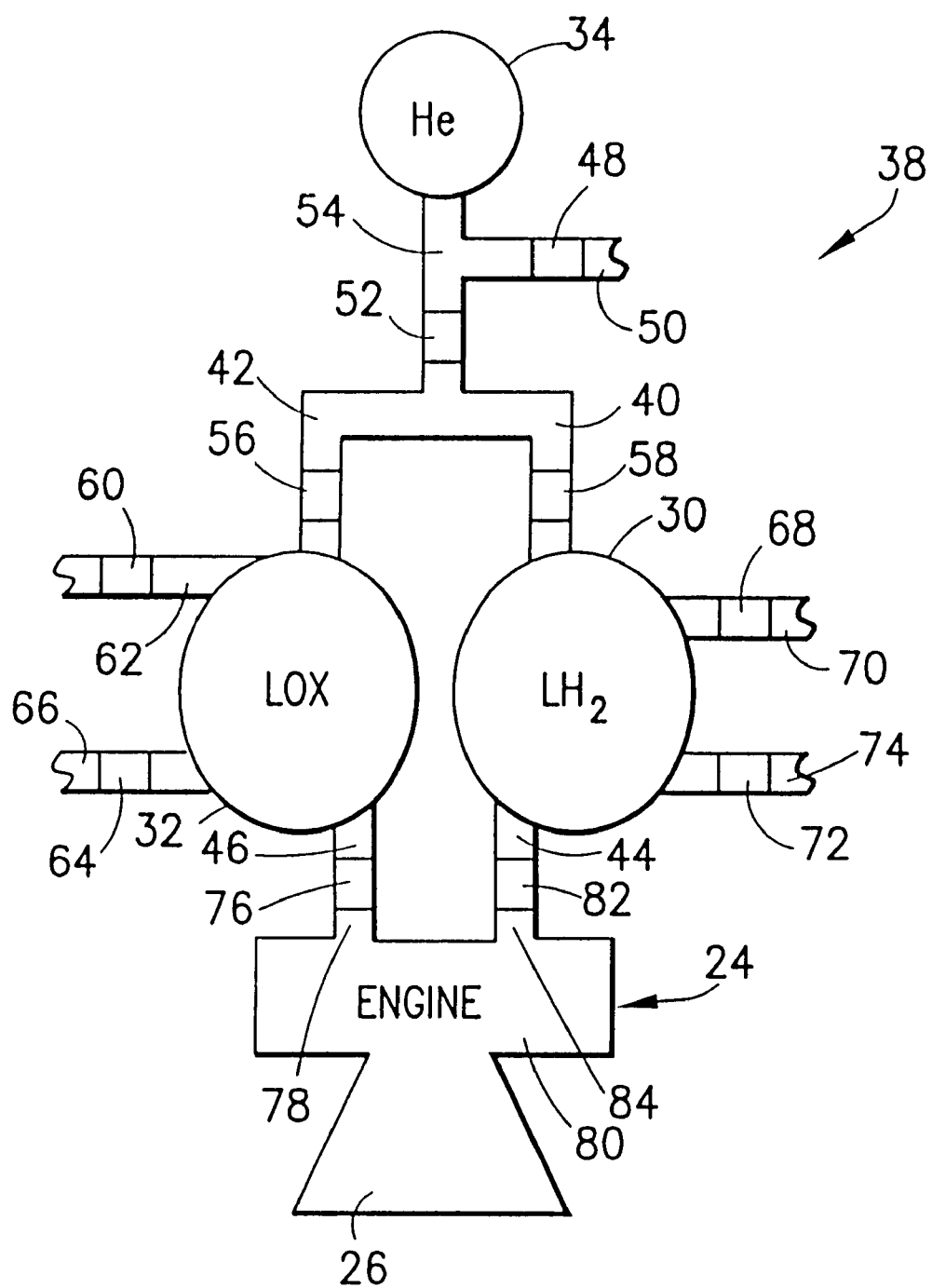
FIG. 4 is a diagrammatic representation of an operating system for the launch vehicle.

Turn now to FIG. 4 for a description of an operating system for the launch vehicle 20. A first conduit system 40 is provided for introducing the inert pressurant gas from said pressurant tank 34 to the fuel tank 30. A second conduit system 42 serves to introduce the inert pressurant gas from the pressurant tank to the oxidizer tank 32. Third and fourth conduit systems 44 and 46, respectively, serve to introduce the fuel from the fuel tank to the rocket engine and the oxidizer from the oxidizer tank to the rocket engine for combustion with the fuel.

Additionally, numerous valves are employed by the operating system 38 to operate at appropriate times during the functioning of the launch vehicle. Specifically, and with continuing reference to FIG. 4, a valve 48 in a supply conduit 50 enables pressurant to be added and removed from outside the launch vehicle. A valve 52 in a main conduit 54 leading to the conduits 40 and 42 serves to isolate the pressurant tank for safety. Valves 56 and 58 and associated pressure regulators in conduits 42 and 40, respectively, serve to control the flow of the pressurant gas to the respective propellant tanks. A fill valve 60 in a fill conduit 62 are provided for filing the oxidizer tank 32 and a drain valve 64 in a drain conduit 66 are provided for draining the oxidizer tank. Similarly, a fill valve 68 in a fill conduit 70 are provided for filling the fuel tank 30 and a drain valve 72 in a drain conduit 74 are provided for draining the fuel tank. Finally, a valve 76 serves to control introduction of oxidizer via conduit 46 to an injector 78 in the engine combustion chamber 80, and a valve 82 serves to control introduction of fuel via conduit 44 to an injector 84 also in the engine combustion chamber 80.

It is considered desirable to mention a number of points with respect to the operating system 38. Valves 48, 52, 56, and 58 are used only for the pressurant gas. Valves 60, 64, 68, 72, 76, and 82 permit cryogenic liquids to flow when open. Valves 52, 76, and 82 are kept closed until shortly before liftoff for safety purposes. Valves 56 and 58 include pressure regulators in series to prevent over pressure or under pressure in the propellant tanks. Valves 60, 64, 68, and 72 are closed after propellant loading and are never reopened once a commitment has been made to proceed to launch.

For operation of the operating system 38 in accordance with the invention, the initial pressure in the pressurant tank 34 is maintained at a level in excess of about 100 bar, the initial pressure in the fuel tank 30 and in the oxidizer tank 32 is maintained at a level in the range of about 8.5 to 20.0 bar, and the initial pressure in the rocket engine chamber 80 is maintained at a level in the range of about 5 to 10 bar.

Figure 3:
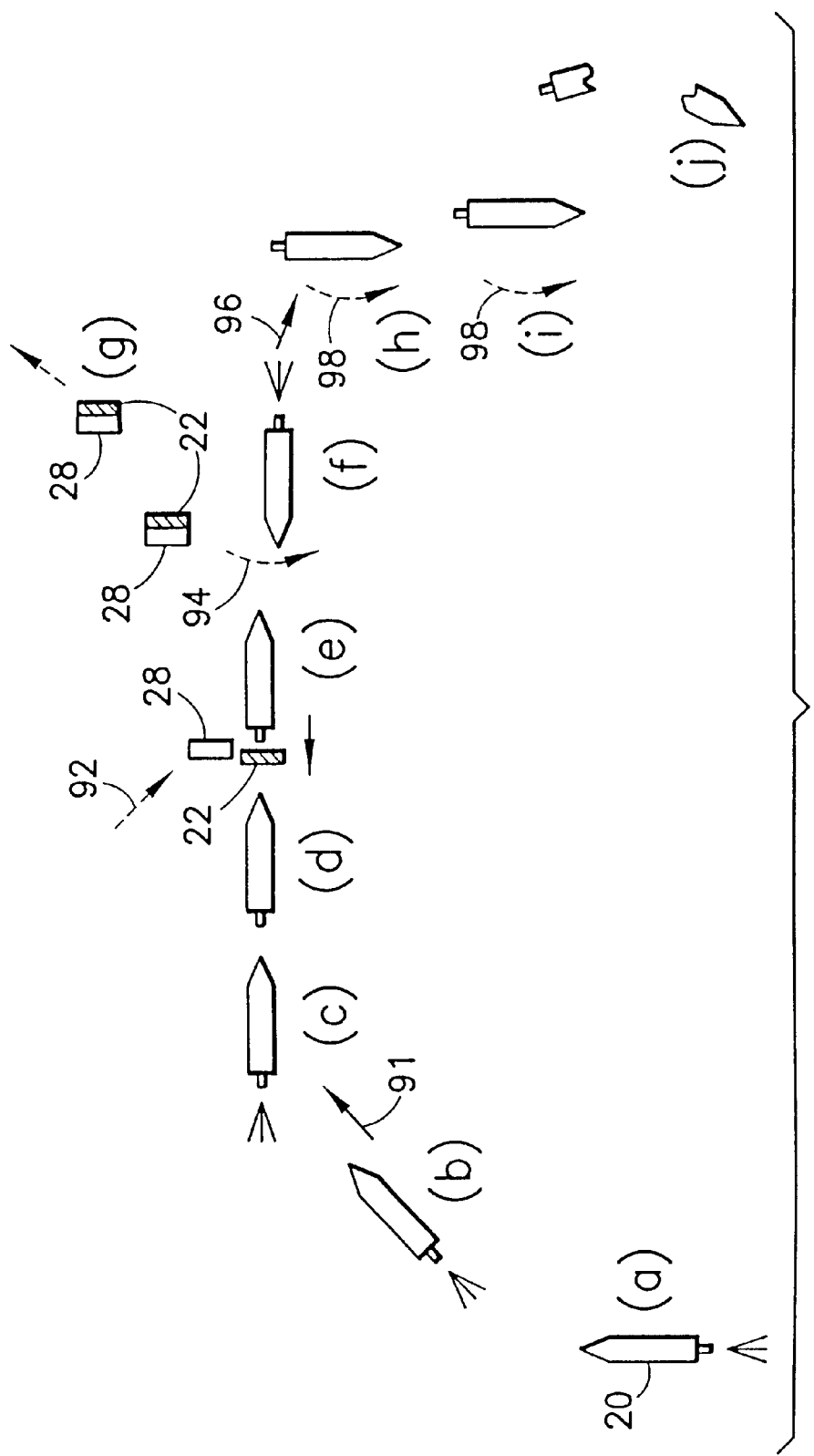
FIG. 3 is a diagrammatic representation of a sequence of operations which occur during the launch, arrival to orbit, then descent and eventual break-up of the launch vehicle.

In the operation of the system of the invention, viewing FIG. 3, the launch vehicle 20 preferably lifts off, at (a), from a floating platform. The single stage engine 24 powers the launch vehicle in a single-stage operation, at (b) after which time the rocket engine 24 is extinguished. The launch vehicle then coasts up, see arrow 91, to the targeted altitude for the low earth orbit. The reaction control subsystem with $N_2$ gas from the RCS tank 36 is operated continuously from the time of launch to rotate the launch vehicle from the (a) orientation through the (b) orientation to the (c) orientation. After the launch vehicle has achieved the (c) orientation, He pressurant gas from the pressurant tank 34 and from the fuel and oxidizer tanks 30, 32 is briefly expelled through the rocket engine 24. Some residual fuel and oxidizer may also be expelled in the course of this step, but without ignition. This operation serves to circularize the orbit for the launch vehicle at the targeted altitude, see (d). With low earth orbit thus achieved, an orbiting maneuvering vehicle (OMV) 28 which remains space-borne for long periods of time, arrives from a higher orbit, as indicated by an arrow 92, at which resides the space station or satellite to be replenished with the consumables carried by the launch vehicle. The consumables are removed from the launch vehicle, attached to the OMV, (e), and the OMV returns to the space station or satellite, (g), with its new payload. Using the reaction control subsystem with $N_2$ gas from the RCS tank, the launch vehicle is re-oriented as indicated by arrow 94, (f). The pressurant gas remaining in the pressurant tank 34 and any pressurant gas, fuel, and oxidizer remaining in the fuel and oxidizer tanks 30, 32 is expelled through the rocket engine 24 without ignition. This operation places the launch vehicle in a downward trajectory, see arrow 96, which causes it to reach a lower altitude within the earth's atmosphere. With continued use of the reaction control subsystem using $N_2$ gas from the RCS tank, the launch vehicle goes to tumble, see arrow 98, (h), and re-enters the atmosphere, (i), at which time the launch vehicle breaks up, (j), with only small pieces likely to reach the surface of the earth, with impact targeted for a mid-ocean landing in that event.

Table 1 summarizes the mass, cost and reliability goals for the system of the invention. Costs are kept low while incurring acceptable impacts to reliability through a number of features. The use of a single pressure-fed main engine is assumed which provides no redundancy but avoids the thermal, contamination and other problems involved in exhaust plume interaction. This engine is only ignited once during the mission and is not re-ignited during flight, minimizing ignition problems. This LV uses a single-stage-to-orbit engine eliminating the need for staging.

TABLE 1

Mass, Cost, and Reliability Goals for Launch Vehicle

| Item | Mass (metric tons) | Cost (K$) | Reliability | Remarks |
|---|---|---|---|---|
| Propellant | 116.6 | 80 | 0.995 | $LH_2$ and LOX |
| Pressurant | 0.7 | 7 | 0.9975 | He |
| RCS (Reaction Control System) propellant | 0.3 | 3 | 0.9975 | $GN_2$ used in a cold-gas, blow-down mode |

TABLE 1-continued

Mass, Cost, and Reliability Goals for Launch Vehicle

| Item | Mass (metric tons) | Cost (K$) | Reliability | Remarks |
|---|---|---|---|---|
| Propellant Tanks, pressure regulators, and valves | 6.0 | 120 | 0.93 | Space Shuttle External Tank heritage dry tank/propellant mass ratio consistent with 6 ton tank holding 116.6 tons propellant, although need to pressurize to 8.5 bar is an issue |
| Pressurant Tank | 1.5 | 90 | 0.95 | Spherical tank 4 m wide sizes girth of LV, graphite construction since must pressurize to over 100 bar |
| RCS (Reaction Control System) Tank | 0.5 | 30 | 0.98 | $GN_2$ used in a cold-gas, blow-down mode |
| Engine (pressure-fed) | 0.5 | 120 | 0.93 | Chamber pressure; 5 bar, Nozzle diameter: 2.7 m |
| Avionics | 0.2 | 10 | 0.99 | Commercial grade equipment |
| Guidance and Control | 0.2 | 10 | 0.98 | Uses GPS (Global Positioning System) and fiber optic gyros for sensors, cold-gas system for actuator |
| Power/Battery | 0.5 | 10 | 0.97 | Primary batteries, service life 12 hr. |
| Thermal protection | 0.6 | 10 | 0.97 | Cryogenic propellants involved |
| Structure (including fins) | 1.1 | 40 | 0.95 | Tank walls are primary load-bearing members |
| Telemetry & Commanding | 0.1 | 10 | 0.99 | |
| Destruct | 0.1 | 10 | 0.9999 | Only redundant feature of LV |
| Payload | 1.0 | 40 | 0.99 | |
| Other | 0.1 | 40 | 0.99 | |
| Overall Total: | 130.0 | 600 | 0.67 | |

While preferred embodiments of the invention have been disclosed in detail, it should be understood by those skilled in the art that various other modifications may be made to the illustrated embodiments without departing from the scope of the invention as described in the specification and defined in the appended claims.

What is claimed is:

1. A low cost expendable self-contained single-stage only to orbit launch vehicle from which no solid vehicle component of substantial size is separated from the vehicle as the vehicle ascends from liftoff to orbit, the vehicle having a moderate reliability in the range of about 0.5 to about 0.8 for launching a payload of consumable items to low earth orbit to supply a space station or satellite, said launch vehicle comprising:

a pressure-fed rocket engine for propelling said launch vehicle without use of turbomachinery;

a nozzle mounted on said rocket engine having a fixed orientation relative to said launch vehicle for aiming products of combustion therefrom in a direction away from said launch vehicle;

a fuel tank containing fuel for delivery to said rocket engine;

an oxidizer tank containing oxidizer for delivery to said rocket engine;

a pressurant tank containing an inert pressurant gas under pressure;

a first conduit system for introducing the inert pressurant gas from said pressurant tank to said fuel tank;

a second conduit system for introducing the inert pressurant gas from said pressurant tank to said oxidizer tank;

a third conduit system for introducing the fuel from said fuel tank to said rocket engine; and a fourth conduit system for introducing the oxidizer from said oxidizer tank to said rocket engine for combustion with the and wherein the initial pressure in said pressurant tank is maintained at a level in excess of about 100 bar;

wherein the initial pressure in each of said fuel tank and said oxidizer tank is maintained at a level in the range of about 8.5 to 20.0 bar; and wherein the initial pressure in said rocket engine is maintained at a level in the range of about 5 to 10 bar.

2. A low cost expendable launch vehicle as set forth in claim 1 including:

a fifth conduit system for adding inert pressurant gas to said pressurant tank or for removing pressurant gas therefrom.

3. A low cost expendable launch vehicle as set forth in claim 1 including:

a sixth conduit system for adding fuel to said fuel tank or for removing fuel therefrom.

4. A low cost expendable launch vehicle as set forth in claim 1 including:

a seventh conduit system for adding oxidizer to said oxidizer tank or for removing oxidizer therefrom.

5. A method of launching a payload of consumable items to low earth orbit to supply a space station or satellite utilizing a low cost expendable self-contained single-stage-only to orbit launch vehicle from which no solid vehicle component of substantial size is separated from the vehicle as the vehicle ascends from liftoff to orbit, the vehicle having a moderate reliability in the range of about 0.5 to about 0.8 comprising the steps of:

(a) providing a rocket engine for propelling the launch vehicle without use of turbomachinery and a nozzle mounted on the rocket engine having a fixed orientation relative to said launch vehicle for aiming products of combustion therefrom in a direction away from the launch vehicle;

(b) providing on the launch vehicle a pressurant tank containing an inert pressurant gas under pressure, a fuel tank containing fuel for delivery to the rocket engine, and an oxidizer tank containing oxidizer for delivery to the rocket engine;

(c) introducing the inert pressurant gas from the pressurant tank to the fuel tank and to the oxidizer tank while maintaining the initial pressure in said pressurant tank at a level in excess of about 100 bar;

(d) under the pressure of the pressurant gas, introducing the fuel from the fuel tank to the rocket engine while maintaining the initial pressure in the fuel tank at a level in the range of about 8.5 to 20.0 bar and maintaining the initial pressure in the nozzle at a level in the range of about 5 to 10 bar; and (e) under the pressure of the pressurant gas, introducing the oxidizer from the oxidizer tank to the rocket engine for combustion with the fuel while maintaining the initial pressure in the fuel tank at a level in the range of about 8.5 to 20.0 bar and maintaining the initial pressure in the nozzle at a level in the range of about 5 to 10 bar.

6. A method of launching a payload as set forth in claim 5 wherein, as a result of step (c), the launch vehicle is caused to lift off and proceed toward its targeted orbit; and including the steps of:

(f) operating a reaction control subsystem to re-orient the launch vehicle from an initial upright orientation through an intermediate angularly disposed orientation to a final orientation generally parallel to the earth's surface;

(g) extinguishing the rocket engine; and (h) without ignition, briefly expelling pressurant gas from the pressurant tank and from the fuel and oxidizer tanks through the rocket engine and residual fuel from the fuel tank and oxidizer from the oxidizer tank through the rocket engine to circularize the orbit for the launch vehicle at the targeted altitude, thereby achieving low earth orbit.

7. A method of launching a payload as set forth in claim 6 wherein, as a result of step (c), the launch vehicle is caused to lift off and proceed toward its targeted orbit; and including the steps of:

(f) once the targeted orbit is achieved and using orbiting maneuvering vehicles which are already space-borne, removing the payload of consumable items from the launch vehicle; and (g) supplying the space station or satellite with the payload of consumable items.

8. A method of launching a payload as set forth in claim 6 including the steps of:

(i) again operating the reaction control subsystem to re-orient the launch vehicle from its final orientation generally parallel to the earth's surface to place it in a downward trajectory; and (j) without ignition, expelling the remaining pressurant gas from the pressurant tank and any pressurant, fuel and oxidizer remaining in the fuel and oxidizer tanks from the fuel and oxidizer tanks through the rocket engine.

9. A method of launching a payload as set forth in claim 8 including the step of:

(k) continuing the operation of step (j), causing the launch vehicle to tumble as it re-enters the atmosphere, breaking up, with only small pieces reaching the surface of the earth.

* * * * *